United States Patent
Gamliel et al.

(10) Patent No.: US 11,221,943 B2
(45) Date of Patent: Jan. 11, 2022

(54) CREATING AN INTELLIGENT TESTING QUEUE FOR IMPROVED QUALITY ASSURANCE TESTING OF MICROSERVICES

(71) Applicant: EMC IP Holding Company LLC, Hopkinton, MA (US)

(72) Inventors: Roi Gamliel, Moshav Tkuma (IL); Amihai Savir, Sansana (IL); Avitan Gefen, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 16/880,108

(22) Filed: May 21, 2020

(65) Prior Publication Data

US 2021/0365357 A1    Nov. 25, 2021

(51) Int. Cl.
*G06F 11/00* (2006.01)
*G06F 11/36* (2006.01)

(52) U.S. Cl.
CPC ...... *G06F 11/3692* (2013.01); *G06F 11/3684* (2013.01); *G06F 11/3688* (2013.01)

(58) Field of Classification Search
CPC ............. G06F 11/3683; G06F 11/3688; G06F 11/3692
See application file for complete search history.

(56) References Cited

U.S. PATENT DOCUMENTS

| | | | |
|---|---|---|---|
| 9,471,478 B1* | 10/2016 | Bhuiya | G06F 11/3692 |
| 2003/0051188 A1* | 3/2003 | Patil | G06F 11/3672 |
| | | | 714/4.4 |
| 2015/0331779 A1* | 11/2015 | Subramaniam | G06F 11/368 |
| | | | 717/124 |
| 2016/0364310 A1* | 12/2016 | Maple | G06F 11/00 |
| 2018/0173606 A1* | 6/2018 | Malla | G06F 11/3688 |

* cited by examiner

*Primary Examiner* — Joshua P Lottich
(74) *Attorney, Agent, or Firm* — Dergosits & Noah LLP; Todd A. Noah

(57) ABSTRACT

Described is a system for creating an intelligent testing queue for improved quality assurance (QA) testing of services (or microservices). The system may perform a graphical analysis of interactions between services to derive testing constraints. For example, the system may monitor services to identify interactions (e.g. API accesses) between the services, and store the interactions as a directed graph representation. The system may traverse the directed graph (e.g. via a breadth-first search) to determine service dependencies. Based on the probability of failure for the testing operations and the service dependencies, the system create a specialized testing queue. By performing testing operations according to the specialized queue, the system may improve certain metrics associated with QA processes such as mean time to failure (MTTF) and mean time to diagnose (MTTD).

20 Claims, 6 Drawing Sheets

| 402 | 180 | 420 |
|---|---|---|
| Service | Testing Operation | Probability of Failure |
| A | Test 1 | 0.2 |
| B | Test 2 | 0.3 |
| C | Test 3 | 0.1 |
| D | Test 4 | 0.2 |
| E | Test 5 | 0.1 |

FIG. 4

| 510 | 520 |
|---|---|
| Ordering based on Probability of Failure (PoF) | Ordering based on PoF + Testing Constraints (e.g. Test Queue) |
| Test 2 | Test 1 |
| Test 1 | Test 3 |
| Test 4 | Test 2 |
| Test 3 | Test 4 |
| Test 5 | Test 5 |

FIG. 5

CREATING AN INTELLIGENT TESTING QUEUE FOR IMPROVED QUALITY ASSURANCE TESTING OF MICROSERVICES

TECHNICAL FIELD

This disclosure relates to quality assurance processes, and more particularly, performing quality assurance processes for services by creating a specialized testing queue for testing operations.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. An application platform that provides such tools may be implemented using a service-oriented architecture (SOA). For example, certain functionality of the application platform may be arranged as a collection of loosely coupled services including microservices (e.g. implemented using a microservices architecture). One benefit of decomposing an application into different services (e.g. microservices) is that it improves modularity. For example, the modular services may communicate through contracts such as application programming interfaces (APIs), and thus, may be developed, deployed, and scaled by individual development teams. However, with such benefits, the costs of managing such service environments dramatically increase. For example, quality assurance (QA) processes required to test all the inter-related services often become increasingly complex, and require considerable analysis to efficiently allocate QA resources. Moreover, QA tools are often not specifically adapted for such service environments. Thus, there is a continued need to efficiently manage QA processes when performing testing for an application platform that implements a SOA.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 4 is a diagram illustrating an example datastore that includes a set of services, a testing operation associated with each of the services, and a corresponding probability of failure for each of the testing operations according to one or more embodiments of the disclosure.

FIG. 5 is a diagram illustrating an example of ordering testing operations to create a testing queue according to one or more embodiments of the disclosure.

DETAILED DESCRIPTION

Figure 1:
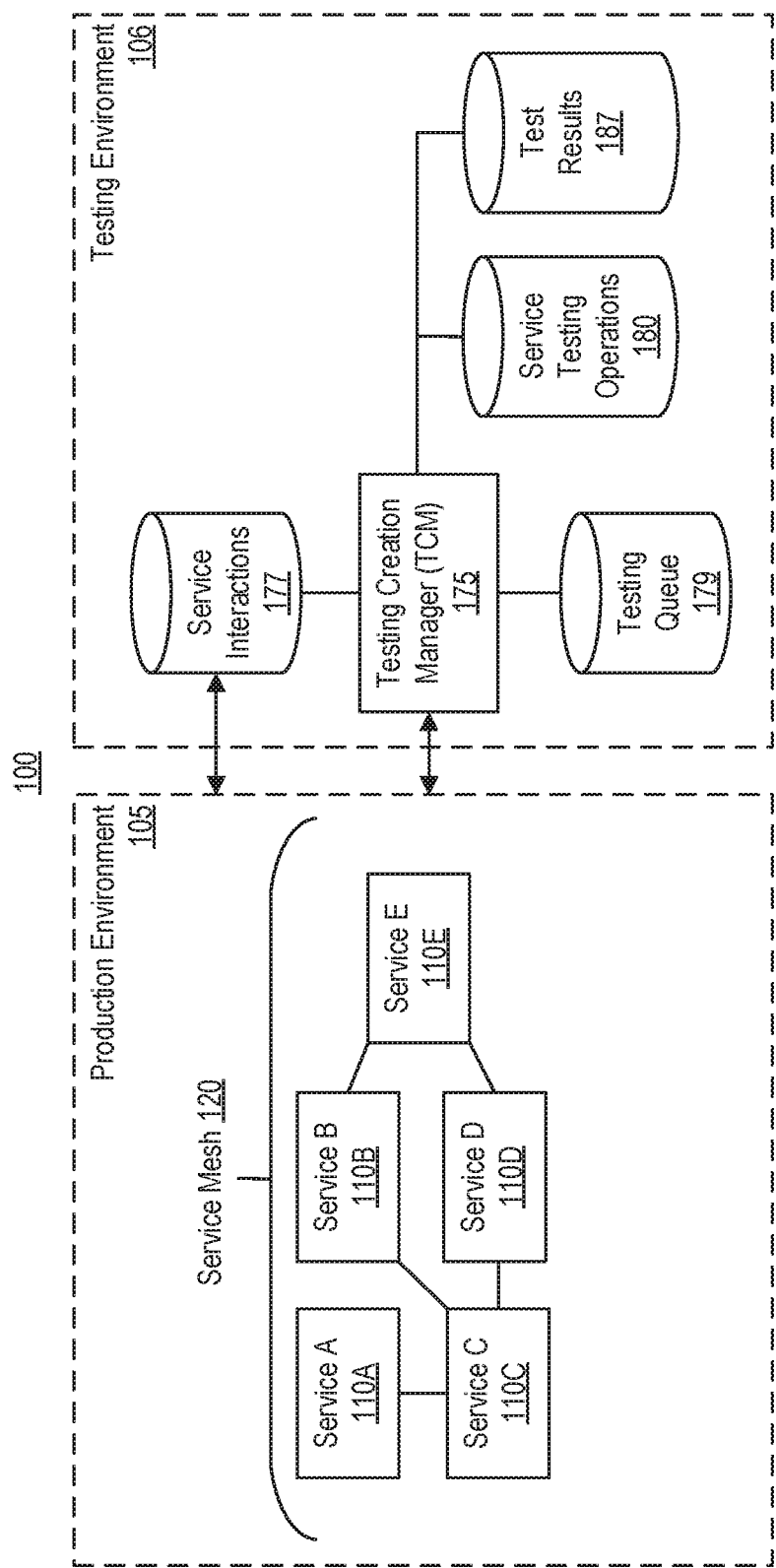
FIG. 1 is a block diagram illustrating an example operating environment for creating a testing queue of testing operations for services of an application platform according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for creating an ordering of testing operations for improved quality assurance (QA) testing of services (or microservices). In some embodiments, the system may prioritize certain testing operations for particular services by creating a specialized testing queue based on constraints derived from service dependencies and failure metrics associated with the testing operations. In some embodiments, the system may perform a graphical analysis of interactions between services to derive testing constraints. For example, the system may monitor services to identify interactions (e.g. API accesses) between the services, and store the interactions as a directed graph representation. Accordingly, the system may traverse the directed graph (e.g. via a breadth-first search) to determine service dependencies. The system may also determine a failure rate for testing operations associated with the services. Based on the failure rates of the testing operations and the service dependencies, the system create a specialized testing queue for the testing operations. Thus, in some embodiments, the system may perform testing operations by leveraging an intelligent ordering that improves QA metrics such as mean time to failure (MTTF) and mean time to diagnose (MTTD).

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and recovery (or backup) services. For example, at least some functionality may be provided by, or implemented in connection with, various application platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

More specifically, and with reference to FIG. 1, shown is a block diagram illustrating an example operating environment 100 for creating a testing queue of testing operations for services of an application platform according to one or more embodiments of the disclosure.

The operating environment 100 may include various components that may interact via a network, which may be any type of wired or wireless network including a local area network (LAN), a wide area network (WAN), a direct communication link, or other suitable connection.

As shown, the operating environment 100 may include a set of services (or microservices) 110 that, in general, are each capable of performing a discrete task (or operation, procedure, function, etc.). As shown in this example, the set of services 110 may include a particular subset of services including services 110A-E. Each service 110 may communicate with other services 110 to perform larger complex tasks, for example, as part of the application platform. In some embodiments, the services 110 may communicate with each other through application programming interfaces (APIs). In some embodiments, the services 110 may be implemented in conjunction with a service mesh 120. For example, a service mesh 120 may be an infrastructure layer for facilitating service-to-service communications. In some embodiments, the service mesh 120 may use sidecar proxies to facilitate such communications. For example, a sidecar may be an additional process, service, or container that is deployed alongside an existing service to route requests between the services 110.

In some embodiments, the services 110 may execute within a production environment 105. As described, in some embodiments, the production environment 105 may represent a cloud-based computing environment that includes a data protection and recovery platform (e.g. SaaS). For example, the production environment 105 may provide cloud-based computing resources to clients (or customers, tenants, users, accounts, entities, etc.) of the data protection and recovery platform. In some embodiments, at least some of the functionality of the platform may be provided by the services 110.

A testing creation manager (TCM) 175 may interact with the components of the production environment 105 to obtain information related to the interactions of the services 110 within the production environment 105. This information may be stored as part of a datastore for service interactions 177. For example, the service interactions 177 may include a data structure representing the interactions between services as a directed graph as further described herein. In addition, as further described herein, the service interactions 177 may include a dependency list associated with each service indicating other services that are dependent upon the service.

The TCM 175 may also interact with other components within a testing environment 106 to perform testing associated with the services 110. In some embodiments, the testing environment 106 may include various components (e.g. VMs) that simulate various configurations of the production environment 105. For example, testing environment 106 may represent computing environments implemented (or potentially implemented) by a client of the data protection and recovery platform.

In order to test the services 110, each service 110 may be associated with one or more service testing operations (or testing operations) 180. For example, a testing operation 180 may test (or verify) certain functionality (e.g. various APIs) of a particular service 110. In some embodiments, the testing operations 180 may be performed (or executed) within the testing environment 106. In response to performing testing operations 180, various metrics and results may be stored as test results 187. In some embodiments, the test results 187 may include various statistics associated with the success or failure of particular testing operations 180. For example, the test results 187 may include historical failure rates for performing particular testing operations 180. As further described herein, the TCM 175 may use such test results 187 and the service interactions 177 to create a testing queue 179. For example, the testing queue 179 may be a specialized ordering of particular testing operations 180 to perform an intelligent testing of a subset of services (e.g. service 110A-E). Accordingly, to provide such functionality, the TCM 175 may coordinate (or manage, orchestrate, execute, automate, etc.) various operations (or processes, methods, etc.) for the intelligent ordering of testing operations 180. For example, the TCM 175 may direct (or control, initiate, etc.) other components of the operating environment 100 to perform various operations as further described herein. In addition, in some embodiments, the TCM 175 may also provide an interface that allows a user to configure various settings associated with performing the intelligent ordering.

As described, one or more components of the operating environment 100 (e.g. TCM 175) may perform an intelligent ordering of testing operations 180 for services 110 by performing a specialized process that acquires information related to service interactions 177 and testing results 187. An example of such a specialized process is further described with reference to FIG. 2.

Figure 2:
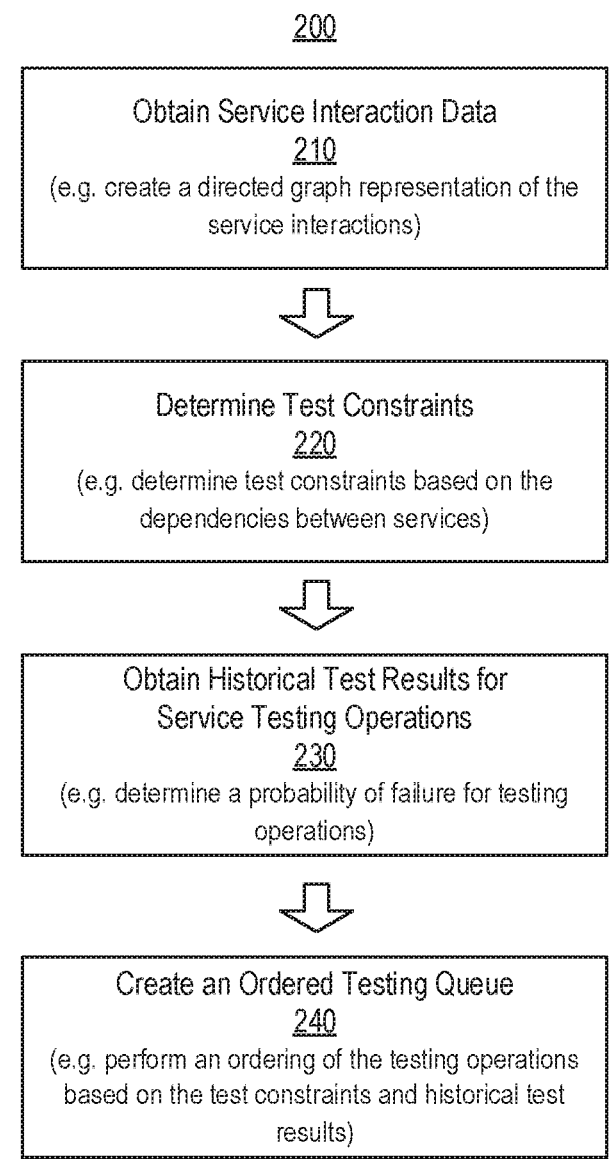
FIG. 2 is a process flow diagram illustrating an example process flow for creating a testing queue based on test constraints and test results according to one or more embodiments of the disclosure.

FIG. 2 is a process flow diagram illustrating an example process flow for creating a testing queue for testing operations (e.g. testing operations 180) according to one or more embodiments of the disclosure. Process 200 may use processing logic, which may include software, hardware, or a combination thereof. For example, process 200 may be performed by a system (e.g. TCM 175) including one or more components described in operating environment 100.

As shown, in 210, the system may obtain service interaction data (e.g. service interactions 177). In some embodiments, the system may monitor services (e.g. services 110) to obtain the service interaction data. For example, the system may interact with a component of the service mesh (e.g. service mesh 120) to obtain service interaction data. In some embodiments, a specialized component of the service mesh (e.g. centralized component) may store routing information from sidecar proxies that route requests between services. Accordingly, such routing information may be obtained from the service mesh to obtain the service interaction data. For example, the interaction data may include capturing the communications between services. In some embodiments, these communications may include a service accessing an API of another service. Put another way, these communications may include a service (e.g. first service) consuming an API (or API procedure) of another service (e.g. second service). In some embodiments, these communications may be stored in a particular data structure. For example, the system may store such data by creating a graph representation of the communications. Accordingly, the data structure (or datastore) storing the graph may include an adjacency list or matrix, although any other suitable data structure is contemplated. In some embodiments, each service may represent a node of the graph, and a directed edge (u, v) of the graph may represent a service v consuming an API of service u. In other words, service v may represent the consumer, and service u may represent the producer of a particular API procedure (or operation, function, method, etc.). An example of such a graph is provided with reference to FIG. 3.

Figure 3:
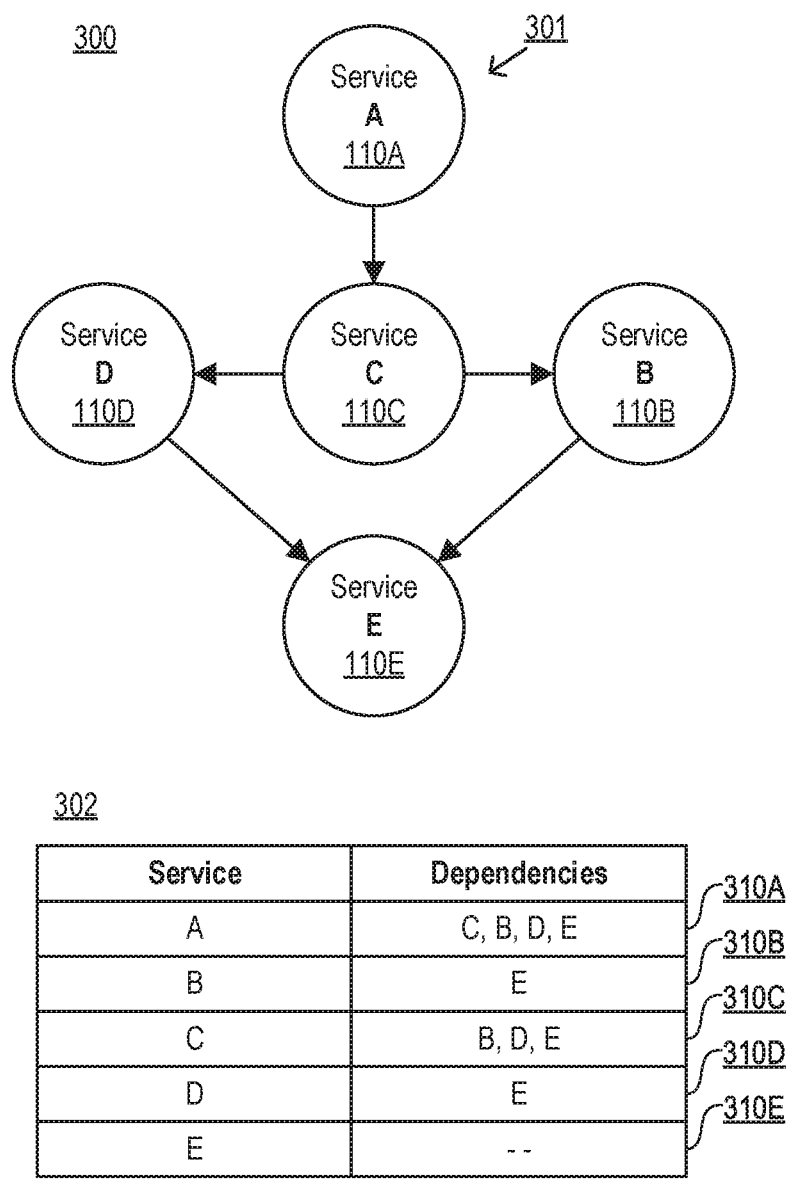
FIG. 3 is a diagram illustrating an example directed graph representation of interactions between services of an application platform according to one or more embodiments of the disclosure.

FIG. 3 is a diagram 300 illustrating an example directed graph representation of interactions between services of an application platform according to one or more embodiments of the disclosure. As shown, the nodes of the directed graph 301 may represent a particular subset of services (e.g. services 110A-E), and the set of directed edges may each represent an interaction between the services. Accordingly, as shown, service C 110C may consume an API from service A 110A, and thus, the graph 301 includes a directed edge from service A 110A to service C 110C. Continuing with this example, as shown by the directed edges, services B 110B, and D 110D may consume an API from service C 110C; and service E 110E may consume APIs from services B 110B, and D 110D; and no other services of the subset consume an API from service E 110E. Thus, the graph 301 may efficiently store a representation of the interactions between services, and the system may perform additional operations on the graph 301 (e.g. traverse to graph 301) to derive additional information as necessary.

Returning to FIG. 2, in 220, the system may determine a set of test constraints associated with the services (e.g. a subset of services to be tested). In some embodiments, the test constraints may be determined based on the dependencies between the services. Put another way, the system may determine the other services that are dependent upon a particular service. For example, the dependencies for a particular service may include the downstream set of services that consume an API from the particular service, or consume an API from one of its descendants. As further described herein, the downstream set of services may also be referred to as an API access chain. In some embodiments, the dependencies may be derived from the data structure (e.g. adjacency list or matrix) storing the graph representation of the interactions, and the determined dependencies (or downstream set, or access chain) for each service may be stored as a dependency list.

For example, with reference to FIG. 3, the system may store a corresponding dependency list 310 for each service as part of a dependency data store 302. As shown, the dependency list 310A for service A includes service C, which consumes an API from service A; services B and D, which consume an API from a descendent (e.g. service C) of service A; and service E, which also consumes an API from a descendent (e.g. service B/D) of service A. Put another way, the dependency list 310A (or downstream set) associated with service A includes services C, B, D, and E, which are those services that are connected to service A as part of an API access (or consumption) chain. Similarly, the dependency list 310B for service B includes service E; the dependency list 310C for service C includes services B, D, and E; the dependency list 310D for service D includes service E; and the dependency list 310E for service E includes no services (or null), or the system may not store a dependency list for service E.

It should be noted that when determining a dependency list 310, the system may use any suitable searching technique to traverse the graph (or tree) 301 such as a breath-first search (BFS). In some embodiments, the system may filter the graph 301 to ensure that no cycles (e.g. circular dependencies) occur within the graph 301. In other words, the system may ensure the graph 301 represents a directed acyclic graph (DAG). More particularly, if $DS(v_i)$ represents the dependency list (or downstream set) for $v_i$, the system may determine (e.g. generate, create, etc.) DS' by removing the connected nodes that contain $v_i$ in their downstream set. More specifically, this may be represented as $DS'(v_i)=\{u \in DS(v_i) |$ if $v_i \notin DS(u)\}$.

As described, the system may determine test constraints based on the dependency lists 310. For example, the system may generate a set of constraints (or test constraints) for each of the services from DS' (e.g. the dependency list with no cycles). In general, the test constraints may specify a preferred ordering of tests. For example, if u is in DS'(v), then v<u. In other words, test operations (e.g. test operations 180) associated with v (or t_v) should be performed before testing operations associated with u (or t_u).

For example, again with reference to FIG. 3, the testing constraints associated with service A may be translated from the corresponding dependency list 310A. More specifically the testing constraints associated with service A may be expressed as service A<services C, B, D, and E, and therefore, testing operations associated with service A should be performed before testing operations associated with services C, B, D, and E. The testing constraints for the other services may be determined in a similar manner. For example, service B<service E; service C<services B, D, and E; service D<service E; and no testing constraints for service E.

Returning once again to FIG. 2, in 230, the system may obtain historical test results for the testing operations. In general, the test results (e.g. test results 187) may relate to metrics for attempting to identify errors as soon as possible when performing testing. For example, testing operations associated with a higher likelihood of failure may be prioritized. In some embodiments, the system may perform a procedure to obtain the test results. For example, the system may execute testing operations associated with the subset of services a predetermined number of times within a testing environment. In response to performing each instance of a testing operation, the system may identify attributes associated with determining whether the testing operation was a pass (e.g. successful) or fail (e.g. unsuccessful). The system may then store a count of the pass/fail statistics within a datastore. The system may then access this datastore to determine a probability of failure for a particular testing operation. For example, a probability of failure may be determined based on a total number of successful (or passed) tests (ST) divided by the sum of the total number of successful tests and the total number of failed tests (FT). In other words, the probability of failure (PoF) may be expressed as $PoF=ST/(ST+FT)$. It should be noted that a probability of failure is given as an example and other testing metrics are also contemplated. In some embodiments, other testing metrics may include metrics that allow the system to identify issues in a prioritized manner. For example, other the metrics may include prioritizing testing operations based on the complexity of the testing operation (or associated service), the importance of the associated service, a number of dependencies of an associated service, the type of testing operation, potential severity of a failure, estimated time to fix a failure (e.g. issues that take longer to fix should be discovered sooner), or any other attributes that may be associated with testing operations. Accordingly, the system may also use suitable techniques to categorize or rank the testing operations based on such metrics. For example, the system may categorize test results as pass/fail, or associate a ranking or weighting to certain testing operations. For instance, testing operations may be ranked based on the time to fix a failure, and accordingly, those with a higher time to fix would be prioritized over those with a lower time to fix.

In 240, the system may create an ordered testing queue for the testing operations associated with the services to be tested. In some embodiments, the system may perform an ordering of the testing operations based on the test results and determined test constraints. For example, the system may perform a first ordering based on the probability of failure for testing operations, and then a second ordering based on the test constraints as further described with reference to FIGS. 4 and 5.

For example, FIG. 4 shows an example datastore 402 that includes a set (or subset) of services (e.g. services 110A-E), a testing operation 180 associated with each service, and a corresponding probability of failure 420 for each of the testing operations. As described, each service may be associated with a particular testing operation, and each testing operation may have a corresponding probability of failure. For example, as shown, services A, B, C, D, and E may be associated with testing operations identified as Test 1, 2, 3, 4, and 5 respectively, and Tests 1, 2, 3, 4, and 5 may have a corresponding probability of failure of 0.2, 0.3, 0.1, 02, and 0.1 respectively. In addition, the testing constraints described above for each service may be translated to the particular testing operations. For example, the testing (or test) constraints may be based on the corresponding dependency list (e.g. dependency list 310) for each service that indicates which testing operations should be performed before a particular testing operation. For example, as described above, the constraints for service A may be expressed as service A<services C, B, D, and E, which translates into indicating that Test 1 should be performed before Test 3, Test 2, Test 4, and Test 5. In order words, the testing constraints for Test 1 may be expressed as Test 1<Test 3, Test 2, Test 4, and Test 5. Similarly, such testing constraints for the testing operations corresponding to services B, C, D, and E (e.g. Tests 2, 3, 4 and 5 respectively) may be expressed as Test 2<Test 5; Test 3<Test 2, Test 4, and Test 5; and Test 4<Test 5. It should be noted that in this example, no test constraints exist for Test 5 because service E does not have any dependent services.

Once the probability of failure and the test constraints are determined, the system may perform an ordering of the testing operations to create a testing queue as further described with reference to FIG. 5.

For example, FIG. 5 shows an example of one or more orderings of testing operations to create a testing queue (e.g. testing queue 179). As described, the system may perform a first ordering based on the probability of failure (e.g. probability of failure 420) for each of the testing operations. As shown, the ordering based on the probability of failure 510, in this example, would include Test 2 (e.g. 0.3 PoF), Test 1 (e.g. 0.2 PoF), Test 4 (e.g. 0.2 PoF), Test 3 (e.g. 0.1 PoF), and Test 5 (e.g. 0.1 PoF). In other words, the first ordering (e.g. ordering 510) may include ordering the testing operations from a highest corresponding probability of failure (or failure rate) to a lowest corresponding probability of failure (or failure rate).

In addition to the first ordering, the system may perform a second ordering based on the determined testing constraints. In other words, as shown, the second ordering may include an ordering based on the probability of failure (PoF) and the testing constraints 520 (e.g. ordering based on PoF+testing constraints). For example, based on the testing constraints, the system may move (or reorder, prioritize, rank, reposition, etc.) the testing operations associated with a particular service ahead of the testing operations associated with the other services that are dependent upon that particular service. Accordingly, the system may traverse each testing operation, and determine whether the testing operations should be moved ahead (e.g. before) any other testing operations within an ordering (e.g. ordering 510).

By way of example, the system may start by considering the testing operation in the first position of the first ordering (e.g. ordering 510), which is Test 2. The system may determine the test constraints for Test 2 (e.g. Test 2<Test 5), and in response, maintain the current ordering (e.g. Test 2, Test 1, Test 4, Test 3, and Test 5) as the test constraints for Test 2 are satisfied (e.g. Test 2 is already ahead of Test 5 in the current ordering).

Next, the system may consider the testing operation in the second position of the first ordering, which is Test 1. The system may determine the test constraints for Test 1 (e.g. Test 1<Test 3, Test 2, Test 4, and Test 5), and in response, move Test 1 ahead of Test 2 to satisfy the test constraints of Test 1. In other words, the system may move Test 1 to a position within the ordering immediately ahead of Test 2. Accordingly, the system may update the current ordering (e.g. current ordering updated to Test 1, Test 2, Test 4, Test 3, and Test 5).

Next, the system may consider the testing operation in the third position of the first ordering, which is Test 4. The system may determine the test constraints for Test 4 (e.g.

Test 4<Test 5), and in response, maintain the current ordering (e.g. Test 1, Test 2, Test 4, Test 3, and Test 5) as the test constraints for Test 4 are satisfied (e.g. Test 4 is already ahead of Test 5 in the current ordering).

Next, the system may consider the testing operation in the fourth position of the first ordering, which is Test 3. The system may determine the test constraints for Test 3 (e.g. Test 3<Test 2), and in response, move Test 3 immediately ahead of Test 2 to satisfy the test constraints of Test 3. Thus, the system may update the current ordering (e.g. current ordering updated to Test 1, Test 3, Test 2, Test 4, and Test 5).

Next, the system may consider the testing operation in the fifth position of the first ordering, which is Test 5. The system may determine the test constraints for Test 5 (e.g. none), and in response, maintain the current ordering (e.g. Test 1, Test 3, Test 2, Test 4, and Test 5).

Accordingly, the system may determine that all of the test constraints are satisfied by performing the second ordering. Thus, in some embodiments, the completed second ordering may be used as the final testing queue (e.g. Test 1, Test 3, Test 2, Test 4, and Test 5).

Accordingly, in some embodiments, the system may create a specialized testing queue that may efficiently identify issues by considering both the probability of failure for testing operations and particular constraints associated with testing operations and/or associated services.

Figure 6:
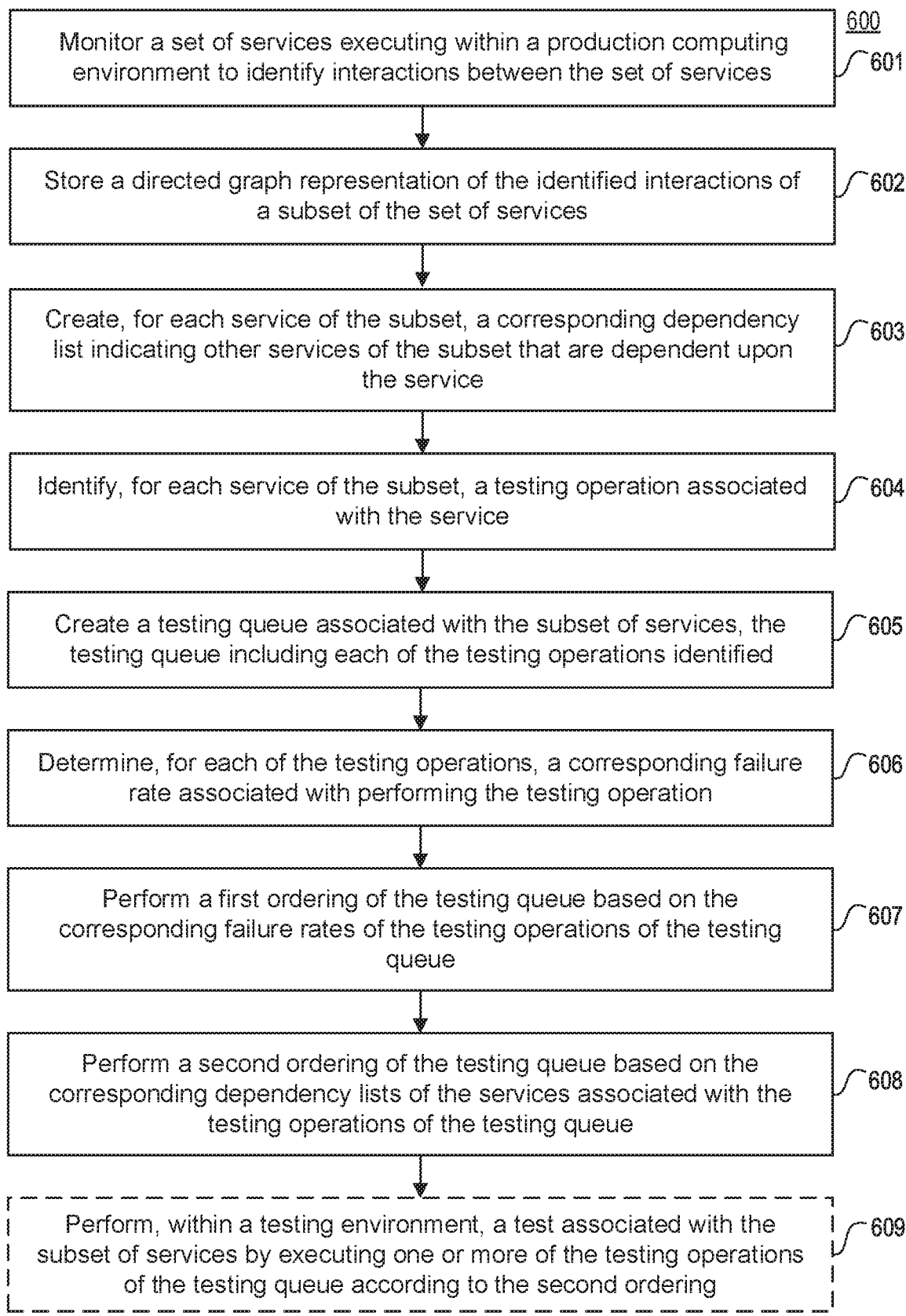
FIG. 6 is a flow diagram illustrating an example method of creating a testing queue of testing operations associated with services according to one or more embodiments of the disclosure.

FIG. 6 is a flow diagram illustrating an example method of creating a testing queue of testing operations for services according to one or more embodiments of the disclosure. Process 600 may use processing logic, which may include software, hardware, or a combination thereof. For example, process 600 may be performed by a system including one or more components described in operating environment 100.

In 601, the system (e.g. TCM 175) may monitor a set of services (e.g. services 110) executing within a production computing environment (e.g. production environment 105) to identify interactions between the set of services (e.g. service interactions 177). For example, the identified interactions between the services may include one service accessing an application programming interface (API) of another service. In some embodiments, the services may include microservices. For example, the microservices may provide functionality for an application platform such as a data protection and recovery platform (or service).

In some embodiments, monitoring the set of services executing within the production computing environment may include receiving, from an interface of a service mesh component (e.g. service mesh 120) associated with the set of services, API access information captured by the service mesh. In some embodiments, the system may deploy a specialized component within the production environment to obtain routing information managed (or captured) by sidecar proxies to obtain the information used to identify the interactions.

In 602, the system may store, within a data structure, a directed graph representation (e.g. graph 301) of the identified interactions of a subset of the set of services (e.g. service 110A-E). In some embodiments, the system may filter the identified interactions of the subset of services graph to remove cycles within the graph representation to create a directed acyclic graph (DAG) as the graph representation.

In 603, the system may create, from the data structure and for each service of the subset, a corresponding dependency list (e.g. dependency list 310) indicating other services of the subset that are dependent upon the service (e.g. within the downstream set of the service). In some embodiments, other services of the subset that are dependent upon the service may include those services that are connected to the service as part of an API access chain. In some embodiments, the system may create a corresponding dependency list for each service by traversing the directed graph by performing a breadth-first search (BFS).

In 604, the system may identify, for each service of the subset, a testing operation (e.g. testing operation 180) associated with the service. For example, the system may identify Tests 1, 2, 3, 4, and 5 are associated with services A, B, C, D, and E respectively, as described above. In some embodiments, testing operations may be associated with certain services based on metadata, tags, labels, or any other type of identifier. For example, as part of a development process for testing operations, developers may label particular tests to associate them with particular services. Accordingly, the system may search these labels to identify particular testing operations.

In 605, the system may create a testing queue (e.g. testing queue 179) associated with the subset of services. In some embodiments, the testing queue may include each of the testing operations identified. For example, the system may create a testing queue with an order that may be updated based on a first and/or second ordering as further described.

In 606, the system may determine, for each of the testing operations, a corresponding failure rate (e.g. probability of failure 420) associated with performing the testing operation. For example, the system may retrieve the failure rates already stored by the system (e.g. data store 402) from previous tests, or perform one or more testing operations to determine one or more failure rates. For example, the system may execute a testing operation a predetermined number of times within a testing environment (e.g. testing environment 106), and determine the corresponding failure rate based on a number of test results that indicate a failure of performing the testing operation.

In 607, the system may perform a first ordering (e.g. ordering 510) of the testing queue based on the corresponding failure rates of the testing operations of the testing queue. In some embodiments, the first ordering may include ordering the testing operations from a highest corresponding failure rate to a lowest corresponding failure rate.

In 608, the system may perform a second ordering (e.g. ordering 520) of the testing queue based on the corresponding dependency lists of the services associated with the testing operations of the testing queue. In some embodiments, the second ordering may include moving the testing operations associated with a particular service ahead of the testing operations associated with the other services that are dependent upon the particular service (e.g. as described above with reference to ordering 520). Accordingly, in some embodiments, the second ordering may be performed after the first ordering.

In 609, the system may perform, within a testing environment, a test associated with the subset of services by executing one or more of the testing operations of the testing queue according to the second ordering.

Figure 7:
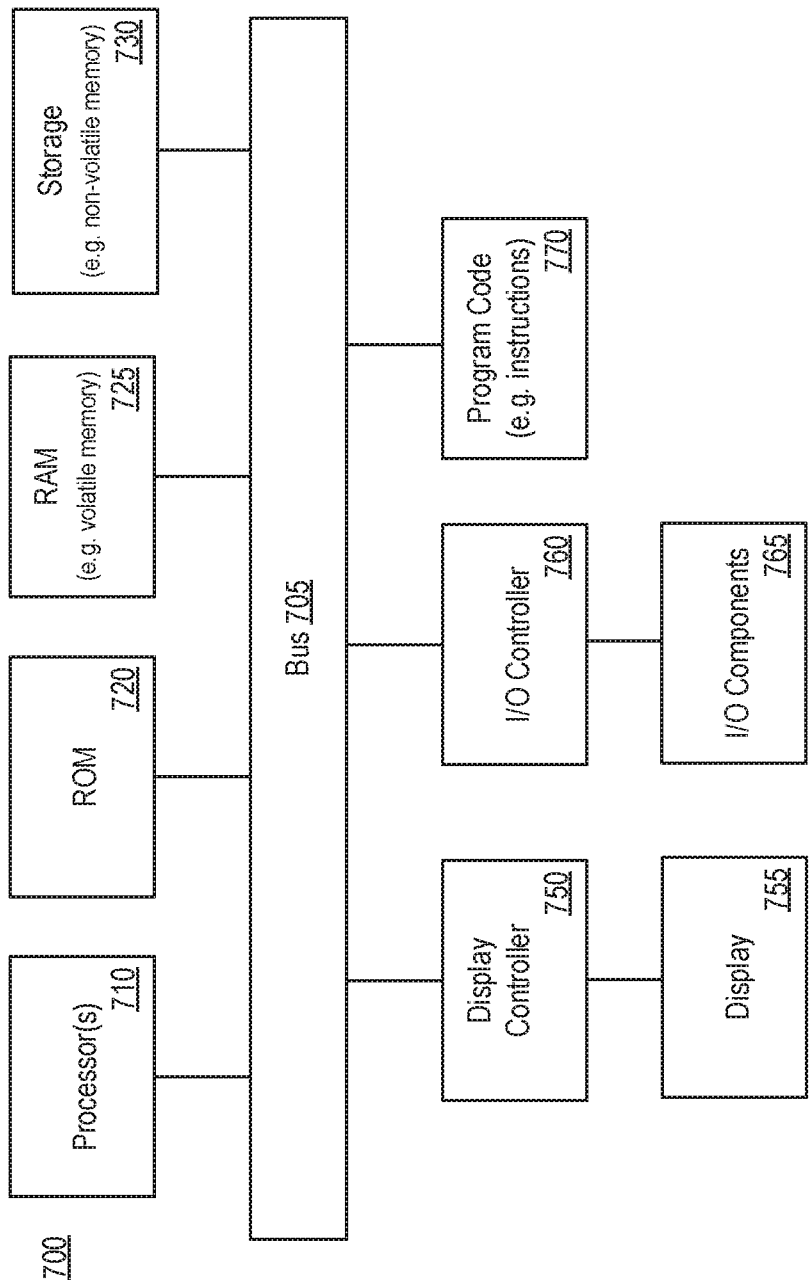
FIG. 7 is a block diagram illustrating an example computing system that may be used in conjunction with one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems (e.g. TCM 175, testing environment 106, operating environment 100, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. TCM 175). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   monitor a set of services executing within a production computing environment to identify interactions between the set of services;
   store, within a data structure, a directed graph representation of the identified interactions of a subset of the set of services;
   create, from the data structure and for each service of the subset, a corresponding dependency list indicating other services of the subset that are dependent upon the service;
   identify, for each service of the subset, a testing operation associated with the service;
   create a testing queue associated with the subset of services, the testing queue including each of the testing operations identified;
   determine, for each of the testing operations, a corresponding failure rate associated with performing the testing operation;

perform a first ordering of the testing queue based on the corresponding failure rates of the testing operations of the testing queue, the first ordering includes ordering the testing operations from a highest corresponding failure rate to a lowest corresponding failure rate; and perform a second ordering of the testing queue based on the corresponding dependency lists of the services associated with the testing operations of the testing queue, the second ordering includes moving the testing operations associated with a particular service ahead of the testing operations associated with the other services that are dependent upon the particular service.

2. The system of claim 1, wherein the plurality of instructions, when executed, further cause the one or more processors to:

perform, within a testing environment, a test associated with the subset of services by executing one or more of the testing operations of the testing queue according to the second ordering.

3. The system of claim 1, wherein determining the corresponding failure rate associated with performing the testing operation includes:

executing the testing operation a predetermined number of times within a testing environment; and determining the corresponding failure rate based on a number of test results that indicate a failure of performing the testing operation.

4. The system of claim 1, wherein the plurality of instructions, when executed, further cause the one or more processors to:

filter the identified interactions of the subset of services graph to remove cycles within the graph representation to create a directed acyclic graph (DAG) as the graph representation.

5. The system of claim 1, wherein monitoring the set of services executing within the production computing environment includes:

receiving, from an interface of a service mesh component associated with the set of services, the identified interactions of the subset of the set of services.

6. The system of claim 1, wherein the identified interactions of the subset of the set of services includes one service of the subset accessing an application programming interface (API) of another service of the subset.

7. The system of claim 1, wherein other services of the subset that are dependent upon the service include those services that are connected to the service as part of an API access chain.

8. The system of claim 1, wherein creating, from the data structure and for each service of the subset, the corresponding dependency list includes traversing the directed graph by performing a breadth-first search.

9. A method of creating a testing queue for testing operations associated with services, comprising:

monitoring a set of services executing within a production computing environment to identify interactions between the set of services;

storing, within a data structure, a directed graph representation of the identified interactions of a subset of the set of services;

creating, from the data structure and for each service of the subset, a corresponding dependency list indicating other services of the subset that are dependent upon the service;

identifying, for each service of the subset, a testing operation associated with the service;

creating the testing queue associated with the subset of services, the testing queue including each of the testing operations identified;

determining, for each of the testing operations, a corresponding failure rate associated with performing the testing operation;

performing a first ordering of the testing queue based on the corresponding failure rates of the testing operations of the testing queue, the first ordering includes ordering the testing operations from a highest corresponding failure rate to a lowest corresponding failure rate; and performing a second ordering of the testing queue based on the corresponding dependency lists of the services associated with the testing operations of the testing queue, the second ordering includes moving the testing operations associated with a particular service ahead of the testing operations associated with the other services that are dependent upon the particular service.

10. The method of claim 9, further comprising:

performing, within a testing environment, a test associated with the subset of services by executing one or more of the testing operations of the testing queue according to the second ordering.

11. The method of claim 9, wherein determining the corresponding failure rate associated with performing the testing operation includes:

executing the testing operation a predetermined number of times within a testing environment; and determining the corresponding failure rate based on a number of test results that indicate a failure of performing the testing operation.

12. The method of claim 9, further comprising:

filtering the identified interactions of the subset of services graph to remove cycles within the graph representation to create a directed acyclic graph (DAG) as the graph representation.

13. The method of claim 9, wherein monitoring the set of services executing within the production computing environment includes:

receiving, from an interface of a service mesh component associated with the set of services, the identified interactions of the subset of the set of services.

14. The method of claim 9, wherein the identified interactions of the subset of the set of services includes one service of the subset accessing an application programming interface (API) of another service of the subset, and wherein other services of the subset that are dependent upon the service include those services that are connected to the service as part of an API access chain.

15. A computer program product comprising a non-transitory computer-readable medium having a computer-readable program code embodied therein to be executed by one or more processors, the program code including instructions to:

monitor a set of services executing within a production computing environment to identify interactions between the set of services;

store, within a data structure, a directed graph representation of the identified interactions of a subset of the set of services;

create, from the data structure and for each service of the subset, a corresponding dependency list indicating other services of the subset that are dependent upon the service;

identify, for each service of the subset, a testing operation associated with the service;

create a testing queue associated with the subset of services, the testing queue including each of the testing operations identified;

determine, for each of the testing operations, a corresponding failure rate associated with performing the testing operation;

perform a first ordering of the testing queue based on the corresponding failure rates of the testing operations of the testing queue, the first ordering includes ordering the testing operations from a highest corresponding failure rate to a lowest corresponding failure rate; and perform a second ordering of the testing queue based on the corresponding dependency lists of the services associated with the testing operations of the testing queue, the second ordering includes moving the testing operations associated with a particular service ahead of the testing operations associated with the other services that are dependent upon the particular service.

16. The computer program product of claim 15, wherein the program code includes further instructions to:

perform, within a testing environment, a test associated with the subset of services by executing one or more of the testing operations of the testing queue according to the second ordering.

17. The computer program product of claim 15, wherein determining the corresponding failure rate associated with performing the testing operation includes:

executing the testing operation a predetermined number of times within a testing environment; and determining the corresponding failure rate based on a number of test results that indicate a failure of performing the testing operation.

18. The computer program product of claim 15, wherein the program code includes further instructions to:

filter the identified interactions of the subset of services graph to remove cycles within the graph representation to create a directed acyclic graph (DAG) as the graph representation.

19. The computer program product of claim 15, wherein monitoring the set of services executing within the production computing environment includes:

receiving, from an interface of a service mesh component associated with the set of services, the identified interactions of the subset of the set of services.

20. The computer program product of claim 15, wherein the identified interactions of the subset of the set of services includes one service of the subset accessing an application programming interface (API) of another service of the subset, and wherein other services of the subset that are dependent upon the service include those services that are connected to the service as part of an API access chain.

* * * * *